Oct. 30, 1962  J. R. KIRBY  3,061,246
FLYING PIPE REFUELING SYSTEM
Filed Dec. 23, 1957  3 Sheets-Sheet 1
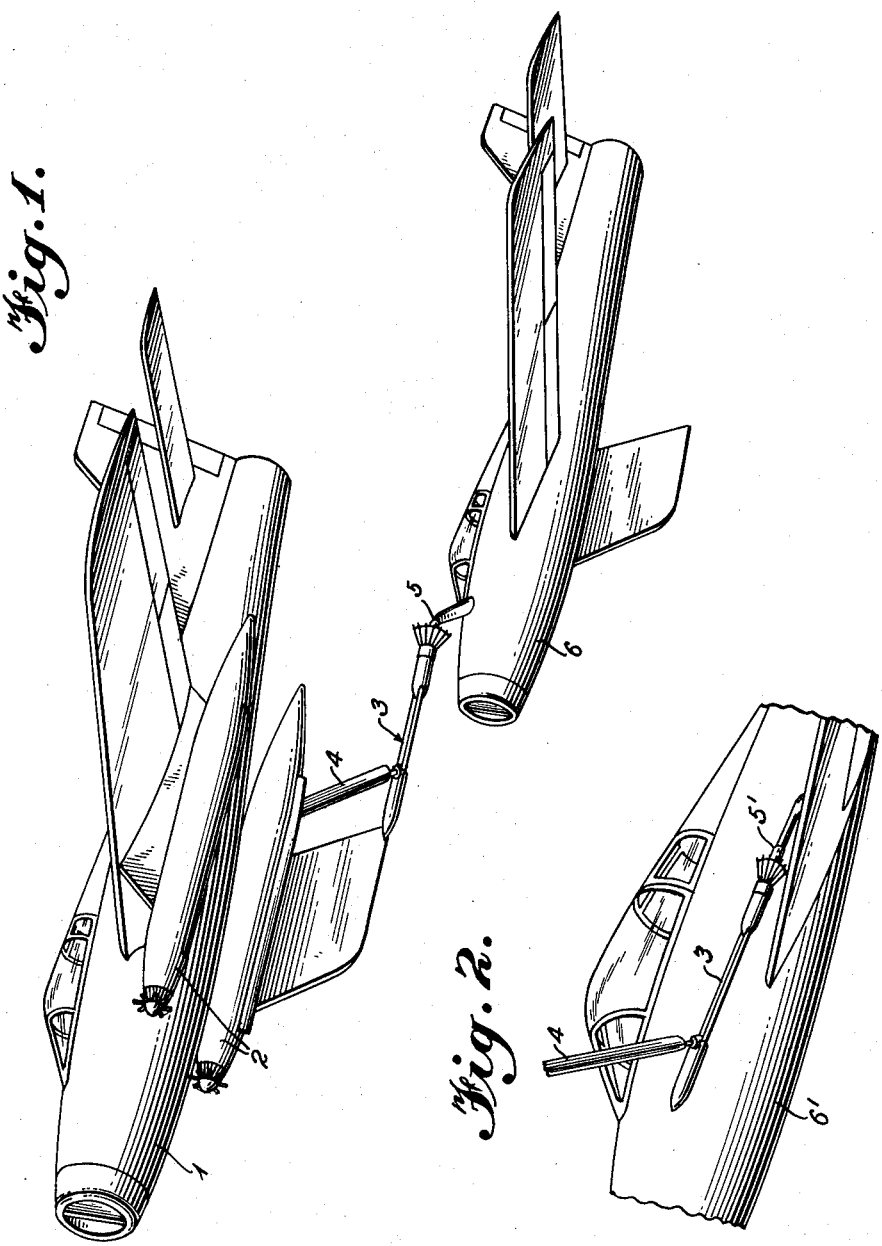
INVENTOR
James Robert Kirby
BY *Stevens, Davis, Miller & Mosher*
ATTORNEYS Oct. 30, 1962 J. R. KIRBY 3,061,246
FLYING PIPE REFUELING SYSTEM
Filed Dec. 23, 1957 3 Sheets-Sheet 2
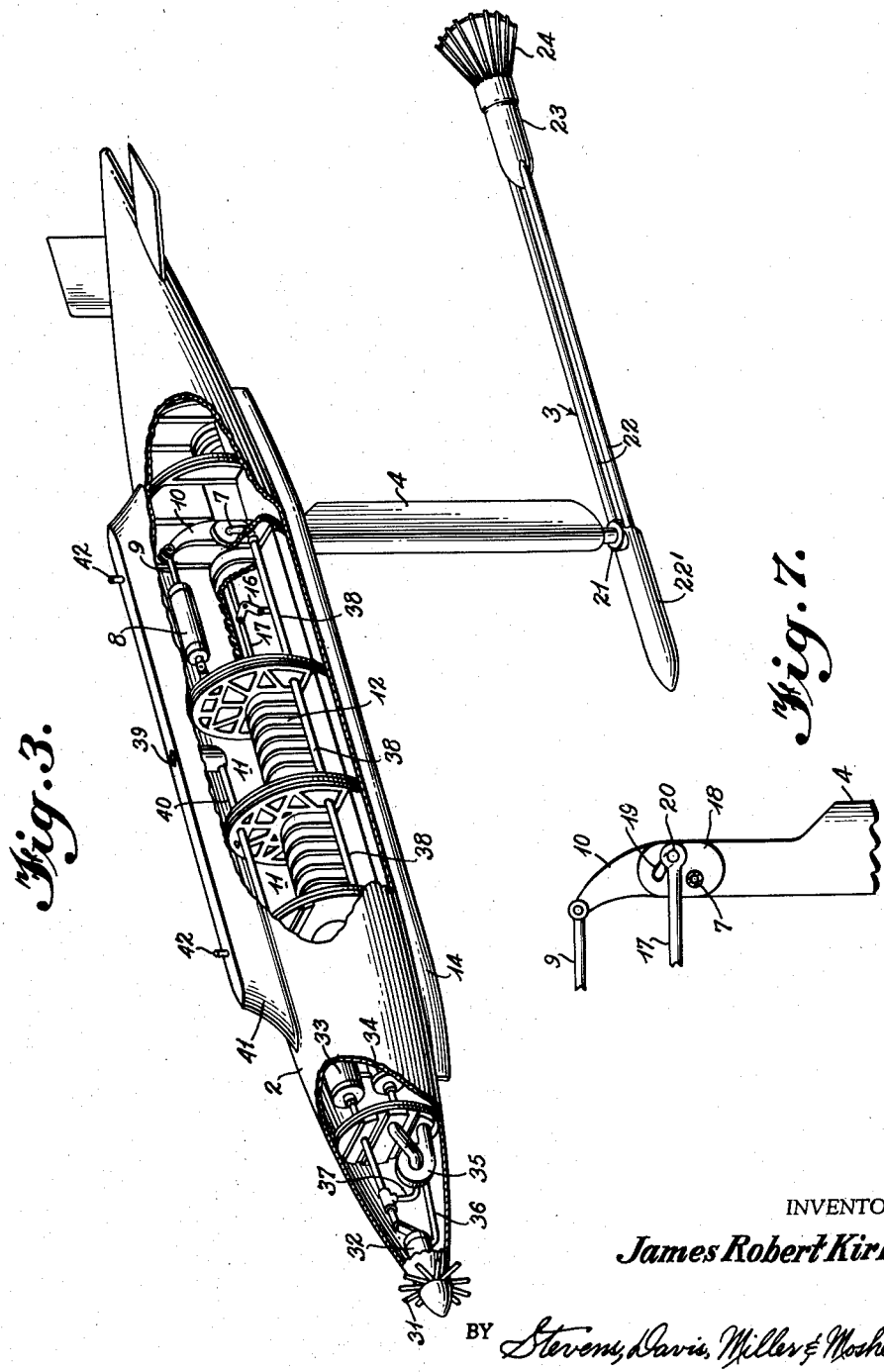
INVENTOR
James Robert Kirby
BY Stevens, Davis, Miller & Mosher
ATTORNEYS

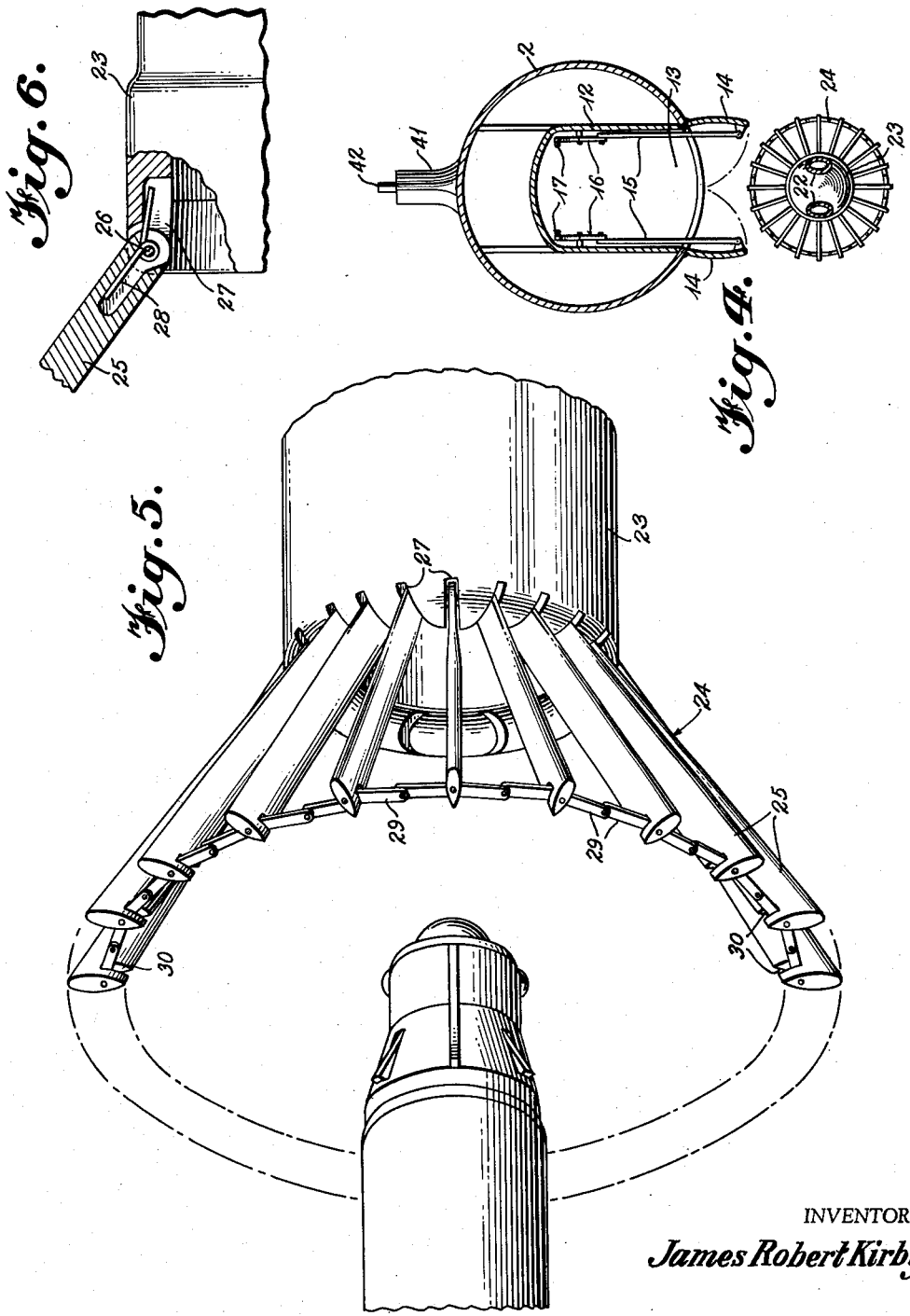

United States Patent Office 3,061,246
Patented Oct. 30, 1962

3,061,246
FLYING PIPE REFUELING SYSTEM
James Robert Kirby, Washington, D.C., assignor to Vitro Corporation of America, New York, N.Y., a corporation of Delaware
Filed Dec. 23, 1957, Ser. No. 704,402
7 Claims. (Cl. 244—135)

This invention relates to a refueling system, more particularly to a system capable of refueling an aircraft from a tanker airplane at high speed.

Refueling systems for aircraft generally require that the receiving airplane be equipped with a probe that is rigidly secured to the aircraft in the operative position, however, it may be arranged to be retracted within some portion of the aircraft when not in use. The probe must extend substantially parallel to the line of flight and may be mounted on a short mast to space it from the fuselage or on a boom extending forwardly from the leading edge of the wing. The drogue of the refueling system is secured to structure on the tanker aircraft and surrounds a reception coupling or socket adapted to receive the probe. The drogue structure is usually a solid sheet metal cone surrounding a reception coupling or socket which causes the coupling to trail generally parallel with the airstream because the airflow is distributed uniformly over its periphery. This is intended to stabilize the reception coupling in the line of flight and works fairly successfully at relatively low speed. The reception coupling has built into it controls to permit the flow of fuel when engagement of the probe in the reception coupling is affected, and to shut off the flow of fuel when the probe disengages the coupling or the receiver airplane exceeds the established angular envelope for refueling, or the receiver airplane overruns the tanker airplane or it is desired by either tanker or receiver airplane to stop the refueling operation. The probe and reception coupling structure can be of any detailed design and have been more or less now standardized for aircraft. In the existing designs, the drogue and the reception coupling assembly is extended from a tanker plane by a flexible fuel hose or by an articulated fuel pipe. The drogue consists of a fixed conical shield surrounding the reception coupling which has aerodynamic properties for positioning the drogue coupling generally aligned with the direction of flight at low speeds. Both tanker airplane and receiver plane must be flown at low speeds to prevent the drogue from whipping or becoming aerodynamically unstable which will preclude the engagement and prevent the refueling operation.

It is an object of the present invention to provide a high speed refueling system that is stabilized for high speed fuel transfer.

It is another object of the present invention to provide a high speed refueling packaged system adaptable to any model aircraft particularly any model having under wing carriage for external stores.

It is another object of this invention to provide, in the high speed packaged refueling system, a flying pipe to support the drogue and coupling in the operative position.

It is another object of this invention to provide a pod packaged system having an upper articulated pipe adapted to extend the flying pipe from the pod to the operative position, which flying pipe is stabilized for high speed flight.

It is another object of this invention to provide a flying pipe pivotally supported on the lower end of a pipe system extending from a pod in which the flying pipe is mass balanced about the pivot point or point of support.

It is another object of this invention to provide a packaged fueling system which is complete within the pod including a self-powered system for both operation of the refueling and fuel pumping system.

Further and other objects of this invention will be apparent from consideration of the drawings in which like numerals refer to like parts.

In the drawings:

FIGURE 1 is a perspective view of the invention in operation between a tanker airplane and a receiver airplane.

FIGURE 2 is a fragmentary view showing refueling with a wing-mounted probe.

FIGURE 3 is a perspective view of the pod packaged system showing the upper pipe and flying pipe in an extended or operative position.

FIGURE 4 is a sectional view through the rear portion of the pod showing the mechanism to collapse the strut cone to fit within the pod.

FIGURE 5 is a fragmentary enlarged view of the system showing details of the probe and strut cone surrounding the reception coupling.

FIGURE 6 is a fragmentary sectional view showing one form of biasing means for the strut of a stabilizing means of the cone. FIGURE 7 shows a mechanism for actuating the doors.

The drawings illustrate in FIGURES 1 and 2, the system of the present invention in operation.

FIGURE 1 shows a high speed aircraft 1 equipped with pods 2 housing a flying pipe refueling system. The flying pipe generally indicated as 3 is shown mounted on the lower end of pipe 4, the upper end of which is pivoted for retraction within pod 2. Probe 5 is of the type mounted on a bracket on the fuselage of the receiver aircraft 6. It is to be understood that the probe in any installation is connected to conduct the fuel to the fuel storage system of the receiver aircraft.

While the high speed system herein described is particularly advantageous with fuselage mounted probes because of its marked stability at high speed, the system can be used with the same advantage with a wing-mounted probe 5' shown in FIGURE 2 on aircraft 6' which is receiving fuel from pipe 3.

In FIGURES 3 and 4, pod 2 is shown in more detail. Upper pipe member 4 is mounted on a pivot 7 whereby it is adapted to be extended from pod 2. Hydraulic cylinder 8 moves strut 9 which is connected to move the upper end of lever 10 secured to the upper end of pipe 4 from a position within the pod to the extended position. Pod 2 is internally compartmented to house the components of the system as well as to provide some storage space 11, for fuel.

A partition 12 forms an elongated compartment 13 within and along the lower portion of pod 2 to house the pipe assembly 3—4. Doors 14 close the bottom of compartment 13 when pipe assembly 3—4 is retracted within the pod. Rods 15 are actuated by bell cranks 16 and rods 17 to close the doors 14 at the end of the traction stroke of strut 9 and lever 10.

It will be apparent from the foregoing description that as a hydraulic fluid under pressure is applied to cylinder 8, strut 9 will be extended from the cylinder to move lever 10 and pivot upper pipe 4 and with it flying pipe 3 into compartment 13. Rod 17 is moved by any suitable means such as that shown in FIGURE 7. A cam 18 is shown having a slot 19 which engages pin 20 mounted on the end of rod 17. This cam arrangement moves rod 17 to actuate the doors 14 upon the extension and retraction of the pipe assembly 3—4.

Upper pipe 4 is streamlined in cross-section and hollowed to deliver fuel from hollow pivot 7 to swivel joint 21. Flying pipe 3 consists of a pair of fuel delivery pipes 22 extending rearwardly from swivel joint 21 to the reception coupling 23. When the pipe assembly 3—4 is retracted into compartment 13, the trailing edge of member 4 rests between members 22 of flying pipe 3. The forward end of flying pipe 3 is an aerodynamic body 22' of circular cross-section disposed coaxially of the axis of symmetry of the pair of delivery pipes 22 of the pipe structure 3 and coaxially of the reception coupling 23 to mass balance the flying pipe about swivel 21. In other words, the flying pipe 3 can be said to be so balanced about its swivel 21, which is located at the center of mass of the flying pipe, by means of the aerodynamically shaped and coaxially positioned member 22' that when lowered to the balanced and fueling position shown in FIGURE 1 its balance will not be affected or influenced by differences in the air speed of the high speed aircraft on which it is mounted. Fuel can then be pumped from hollow pivot 7 via pipes 4 and 22 to coupling 23.

A strut cone 24 surrounds coupling 23 and serves to stabilize the flying pipe 3 in the direction of flight with a minimum of drag. As shown in FIGURE 5 strut cone 24 consists of a plurality of air foils or vanes 25 and, as shown in FIGURE 6, are pivoted at 26, in a radial slot 27, in the rearward edge of coupling 23. Any suitable means such as spring 28 surrounding pivot 26 and extending into apertures in coupling 23 in vane 25, may be employed to bias the strut to the extended position. Links 29 are pivoted at the middle and to adjacent vanes 25 in slots 30. These slots are so cut that links 29 will break inwardly when a force is exerted on any vane 25 sufficient to overcome spring 28. When such a force is exerted on vanes on generally opposite sides of the cone, the whole assembly will collapse inwardly into a space of about the diameter of coupling 23. Thus, it may be collapsed and stowed in a small compartment 13 when, as shown in FIGURE 4, cone 24 comes in contact with the edges of door 14 and slides upwardly within compartment 13 on any suitable supporting means, to collapse and guide the cone within the compartment, such as rods 15. FIGURE 5 shows the relative position of probe 5 with respect to reception coupling 23.

The system has a power source for actuating its hydraulic system and pumping fuel to the receiver aircraft. Air turbine 31 drives hydraulic pump 32 to charge an accumulator 33 with hydraulic fluid under pressure from reservoir 34. Fuel pump 35 is driven by hydraulic fluid via lines 36—37. The outlet from pump 35 delivers fuel through pipe 38 to hollow pivot 7 and then to flying pipe 3 and reception coupling 23. Pump 35 will pump fuel from storage compartments such as 11 or any other space in the pod that can be used for the storage of fuel. Coupling 39 and line 40 may be utilized to connect the fuel storage system of a tanker aircraft with a pod to deliver fuel to the receiver aircraft if that stored in the pod is not sufficient. Hydraulic pressure is also supplied to cylinder 8 to actuate the retraction system. Suitable electro-mechanical or electro-hydraulic controls are included in the system to make the refueling system automatic, or semi-automatic. Pilot override controls are also provided.

Pylon 41 extends along the top of the pod and is provided with attaching fittings 42 to secure the assembly on the underside of the wing of the aircraft or the pod may be attached to the armament pylon on the underside of military aircraft. From the foregoing description, it will be apparent that the essential features of a refueling pod system for use between high speed aircraft are described, most critical among which are features of a mass balanced flying pipe and the stabilizing means with a minimum of drag.

While the structure and features described relate to the structure and operation of preferred embodiment of this invention, it is to be understood that certain changes, alterations, modifications and substitutions can be made within the spirit and scope of the appended claims.

What is claimed is:

1. A refueling system for high-speed aircraft comprising an elongated pod adapted to be removably mounted on a tanker airplane, said pod having a fuel storage system including a fuel storage compartment and fuel pumping system, an upper pipe means connected to said fuel storage system having pivot means at its upper end in said pod for retraction therewithin, lever means disposed wholly within said pod and connected to and extending upwardly from said upper pipe means, power means connected to said lever means for moving said upper pipe means about said pivot means, a flying pipe having a pivotal connection to the lower end of said upper pipe system and mass-balanced thereon about said pivotal connection, said flying pipe having a fuel socket on its trailing end adapted to receive the fuel probe of a receiver airplane, conduit means extending from said pivotal connection to said fuel socket, and means to stabilize said flying pipe with a minimum of drag at high speed.

2. A fuel transfer system for high-speed aircraft comprising an elongated pod structure, means to detachably secure said pod structure to the tanker aircraft, said pod structure having tank means for a supply of fuel and pipe means that may be stowed in said pod and extended at will, said pipe means consisting of an upper pipe pivoted on its upper end to said pod and interconnected to said tank means, and said pipe having on its lower end a swiveling connection, rigid extension means on the upper end of said upper pipe and disposed wholly within said pod for connection to power actuating means for said pipe, a lower flying pipe connected to said swiveling connection, an aerodynamic mass-balancing body of axially symmetrical section positioned coaxially on said lower pipe and forwardly of said swiveling connection, and reception coupling means on the trailing end of said flying pipe, and means to stabilize said flying pipe with a minimum of drag at high speed.

3. The fuel transfer system as set forth in claim 2, in which said upper pipe is streamlined in cross-section, said flying pipe includes a pair of pipes extending between said swiveling connection and said reception coupling, said reception coupling including a link strut cone structure in surrounding relation thereto and collapsible by mechanical pressure acting against it when said pipe means is stowed in said pod.

4. A fuel transfer system for high-speed aircraft comprising an elongated pod structure, means to detachably secure said pod structure to the tanker aircraft, said pod structure having tank means for a supply of fuel and pipe means that may be stowed in said pod and extended at will, said pipe means consisting of an upper pipe pivoted on its upper end to said pod and interconnected to said tank means, and said pipe having on its lower end a swiveling connection, a lower flying pipe connected to and mass-balanced about said swiveling connection and reception coupling means on the trailing end of said flying pipe, and means to stabilize said flying pipe with a minimum of drag at high speed, an air turbine mounted on said pod, a hydraulic pump connected to be driven by said turbine, an accumulator and hydraulic system connected to said pump to drive means for the transfer of fuel and to drive means for the actuation of said flying pipe refueling system.

5. A fuel transfer system for high-speed aircraft comprising an elongated pod structure, means to detachably secure said pod structure to the tanker aircraft, said pod structure having tank means for a supply of fuel and pipe means that may be stowed in said pod and extended at will, said pipe means consisting of an upper pipe pivoted on its upper end to said pod and interconnected to said tank means, and said pipe having on its lower end a swiveling connection, a lower flying pipe connected to and mass-balanced about said swiveling connection and reception coupling means on the trailing end of said flying pipe, and means to stabilize said flying pipe with a minimum of drag at high speed, comprising a plurality of aerodynamic vanes mounted radially around said reception coupling, said vanes being pivotally mounted on said coupling at the inner ends thereof and having an articulated link means mounted at the outer ends thereof to restrain the radial movement of said outer ends but permit the collapse of said vanes for stowing in said pod.

6. A low drag flying pipe for a high speed fuel transfer system having means to lower said pipe from a tanker airplane into a fuel transfer position, means to connect said flying pipe with a supply of fuel, said flying pipe comprising an elongated member, having on its forward end and aerodynamic body and on its rearward end a reception coupling for the probe of a refueling airplane, means to stabilize said pipe at high speed, said stabilizing means mounted around said reception coupling on the rearward end of said elongated member, a swiveling coupling from said fuel supply means connected to said elongated member so located as to mass-balance said flying pipe about said swiveling coupling, conduit means interconnecting said swiveling means and said reception coupling, said high speed stabilizing means comprising a strut cone means consisting of a plurality of pivotal aerodynamic vanes, said plurality of aerodynamic vanes pivoted on their inner ends and supported in a cone-like arrangement by a plurality of hinged links intermediate each pair of vanes, whereby all of the vanes move to the collapsed position simultaneously.

7. In a fuel system including a reception coupling at the terminal of the fuel delivery system, a high speed stabilizing member surrounding said coupling comprising a plurality of vanes pivoted on their inner end adjacent said coupling and extending radially outwardly, means to bias said vanes in an extended cone configuration, articulated link means mounted adjacent the outer ends of said vanes to collapse all said vanes to a position longitudinal of the axis of said coupling simultaneously.

References Cited in the file of this patent

UNITED STATES PATENTS

| | | |
|---|---|---|
| 1,848,372 | Moran | Mar. 8, 1932 |
| 2,382,412 | Grey et al. | Aug. 14, 1945 |
| 2,692,102 | Cobham et al. | Oct. 19, 1954 |
| 2,823,881 | Patterson | Feb. 18, 1958 |
| 2,859,002 | Leisy | Nov. 4, 1958 |
| 2,879,016 | Haase | Mar. 24, 1959 |
| 2,879,017 | Smith | Mar. 24, 1959 |
| 2,898,060 | Everhardt | Aug. 4, 1959 |
| 2,946,543 | Gordon et al. | July 26, 1960 |

OTHER REFERENCES

Aviation Week Magazine, pages 53 and 55, Aug. 15, 1955.
Aviation Week Magazine, page 99, Dec. 10, 1956.
Aviation Week Magazine, page 34, July 8, 1957.